United States Patent [19]

Klaassen

[11] Patent Number: 5,176,071
[45] Date of Patent: Jan. 5, 1993

[54] DEVICE FOR INJECTING A PIECE OF MEAT WITH A LIQUID SUBSTANCE SUCH AS BRINE

[75] Inventor: Lambertus G. M. Klaassen, Rosmalen, Netherlands

[73] Assignee: Stork Protecon B.V., Oss, Netherlands

[21] Appl. No.: 717,530

[22] Filed: Jun. 19, 1991

[30] Foreign Application Priority Data

Jun. 20, 1990 [NL] Netherlands .......................... 9001410

[51] Int. Cl.[5] .......................... A22C 17/00; A23L 1/31
[52] U.S. Cl. ...................................... 99/533; 99/487; 99/535
[58] Field of Search ................. 99/516, 534, 532, 533, 99/535, 536, 494, 487; 426/281; 27/24.1

[56] References Cited

U.S. PATENT DOCUMENTS

| | | |
|---|---|---|
| 3,006,767 | 10/1961 | Huckabee . |
| 3,347,679 | 10/1967 | Nordin ................................. 99/535 |
| 3,436,230 | 4/1969 | Harper, Jr. et al. . |
| 3,675,567 | 7/1972 | Rejsa et al. . |
| 3,739,713 | 6/1973 | Kudale et al. ........................ 99/487 |
| 3,769,037 | 10/1973 | Sholl . |
| 3,814,007 | 6/1974 | Lumby et al. ........................ 99/532 |
| 4,142,000 | 2/1979 | Townsend ............................ 426/281 |
| 4,388,859 | 6/1983 | Sommer .............................. 99/533 |
| 4,408,519 | 10/1983 | Schill ................................... 99/486 |

FOREIGN PATENT DOCUMENTS 0056780  11/1988  Japan ..................................... 99/535

Primary Examiner—Timothy F. Simone
Attorney, Agent, or Firm—Webb, Burden, Ziesenheim & Webb

[57] ABSTRACT

A method and device for injecting liquid substances such as brine or paste into a piece of meat. During injection, the piece of meat, which is conveyed over a row of spray nozzles, is held in contact with a row of the nozzles, preferably by means of a pressure roller. The rotational shaft of the roller is situated opposite the row of spray nozzles. This allows for deforming the meat to a slab of predetermined thickness and prevents the injection stream from being atomized prematurely, that is, outside the meat. This results in a homogeneous distribution of the brining liquid in the meat.

6 Claims, 3 Drawing Sheets

DEVICE FOR INJECTING A PIECE OF MEAT WITH A LIQUID SUBSTANCE SUCH AS BRINE

BACKGROUND OF THE INVENTION

The invention relates to a method for introducing liquid substances such as brine or paste into a meat piece, wherein the liquid substance is injected into the meat piece.

The invention relates more particularly to the injecting of brining liquid into a piece of meat without needles or other mechanical means being inserted into the piece of meat. To this end the brining liquid is sprayed at high pressure from a spray nozzle into the meat which, in the known methods, results in the surface of the meat being damaged.

The invention has for its object to improve the above mentioned method such that this damage does not occur.

SUMMARY OF THE INVENTION

The method according to the invention is distinguished in that during injecting the piece of meat is held in contact with one or more spray nozzles for injecting the liquid substance.

The contact prevents the injection stream being atomized prematurely, that is, outside the meat, which would result in a greater spraying spot.

According to a further development the meat piece is deformed using mechanical means to a slab of predetermined thickness and with a certain width. Owing to the deforming of the meat to a determined thickness the required injecting pressure is reduced, which also contributes towards reducing the damage to the meat surface.

It is further recommended in each case to subject the meat piece according to a determined grid to at least one stream of liquid substance under superatmospheric pressure. The most homogeneous possible distribution of the brining liquid in the meat is thus obtained, wherein it is recommended according to the invention to make the grid size a maximum of 2 cm, and preferably 1 cm.

To avoid damage to the meat, particularly red meat, the invention proposes to make the thickness of the meat piece for deforming a maximum of 2 cm so that with a penetration depth of 1 cm 50% of the meat is already cured.

The invention further relates to a device for performing the above stated method, which device is provided with a frame and one or more spray nozzles for the liquid substance carried by the frame, which device is distinguished in that means are arranged for holding the piece of meat in contact with the or each spray nozzle. According to a further development of the device according to the invention it is embodied with means for deforming the piece of meat, in particular close to the spray nozzles.

With such an embodiment the meat piece is carried along the spray nozzles whereby these latter can have a stationary disposition, which facilitates the supply of brining liquid under high pressure and control of the comparatively short spraying times.

In a preferred embodiment the transporting means are embodied as a conveyor carrying the piece of meat.

In preference the spray nozzles are disposed in a line perpendicular to the conveying direction of the meat piece, wherein the conveyor can be embodied as an endless belt whereof at least one reversing roller is arranged adjacent to the row of spray nozzles.

According to the invention the deforming means can effectively be embodied as a pressure roller whereof the rotational shaft is situated opposite the row of spray nozzles. According to the invention this rotational shaft can be distance-adjustable relative to these spray nozzles.

According to another embodiment the means for deforming the meat piece can be embodied as a pressure chamber having two substantially parallel walls, in the one of which the row of spray nozzles is arranged and the other wall whereof converges relative to the one wall towards the spray nozzles, and wherein the transporting means is a piston movable reciprocally between the two walls.

BRIEF DESCRIPTION OF THE DRAWINGS

Above mentioned and other features of the invention will be further elucidated in the FIGURE description hereinbelow of a number of embodiments. In the annexed drawing.

DESCRIPTION OF THE PREFERRED EMBODIMENTS

Figure 1:
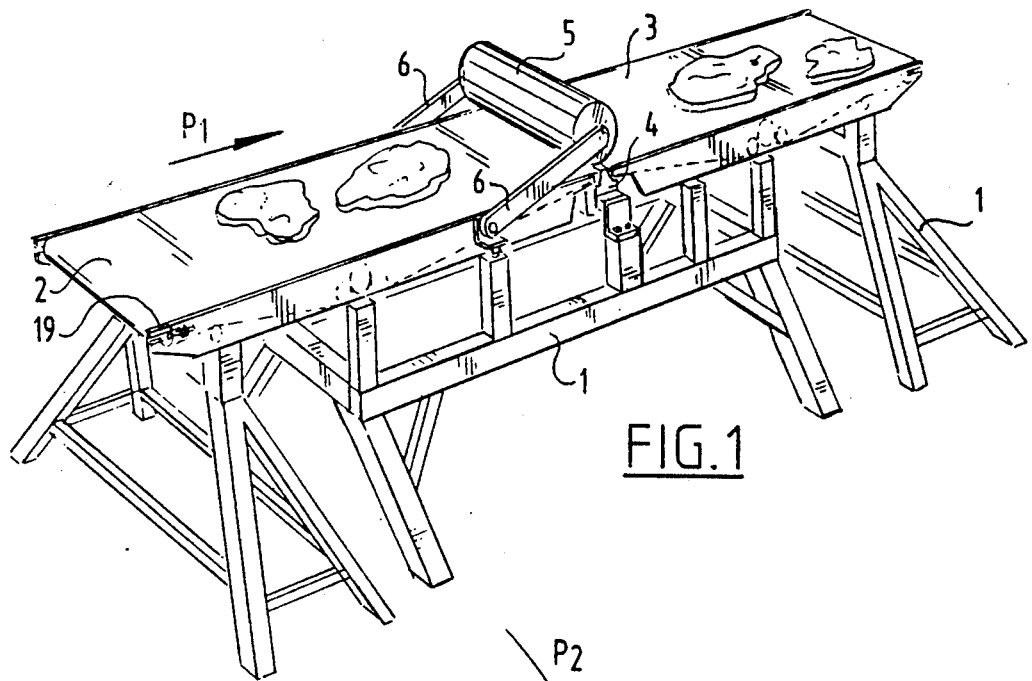
FIG. 1 shows a perspective view of a first embodiment of a device according to the invention provided with an endless conveyor with co-acting pressure roller.

The device according to FIG. 1 consists of a frame 1 of random type, which in the embodiment shown is made from tube profiles, this such that two endless conveyors 2, 3 can be supported in line with one another. Received between the two conveyors 2, 3 is a beam 4 having arranged therein spray nozzles to be further elucidated hereinafter, this such that these are arranged in a line perpendicular to the conveying direction P1. A pressure roller 5 which serves as deforming means for the meat is rotatably arranged opposite and above the beam 4, wherein it is noted that the rotational shaft of the roller 5 is received at either end in each case in a swivel arm 6.

Figure 2:
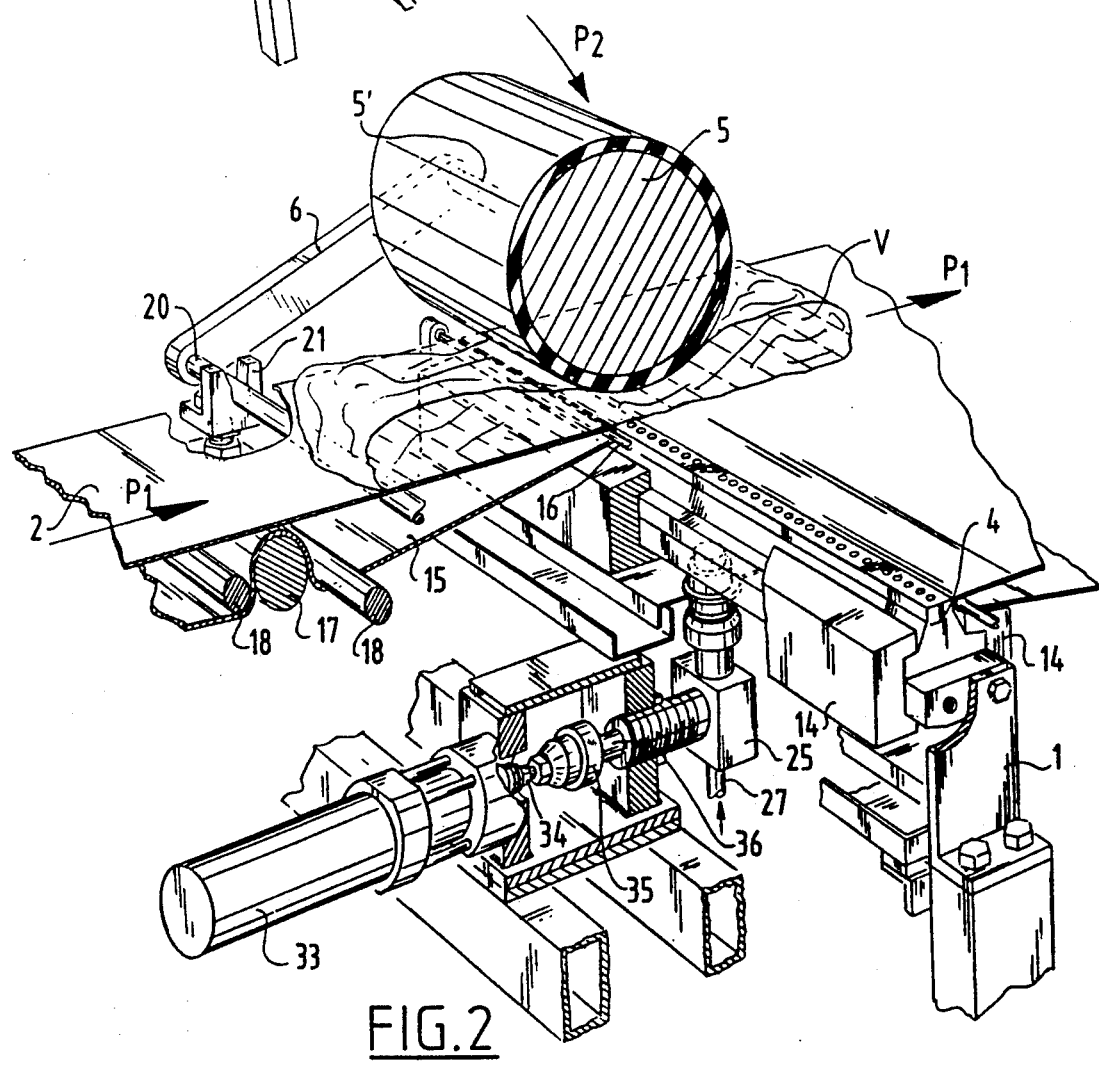
FIG. 2 shows a detail of the device of FIG. 1 on enlarged scale with partly broken away parts.
Figure 3:
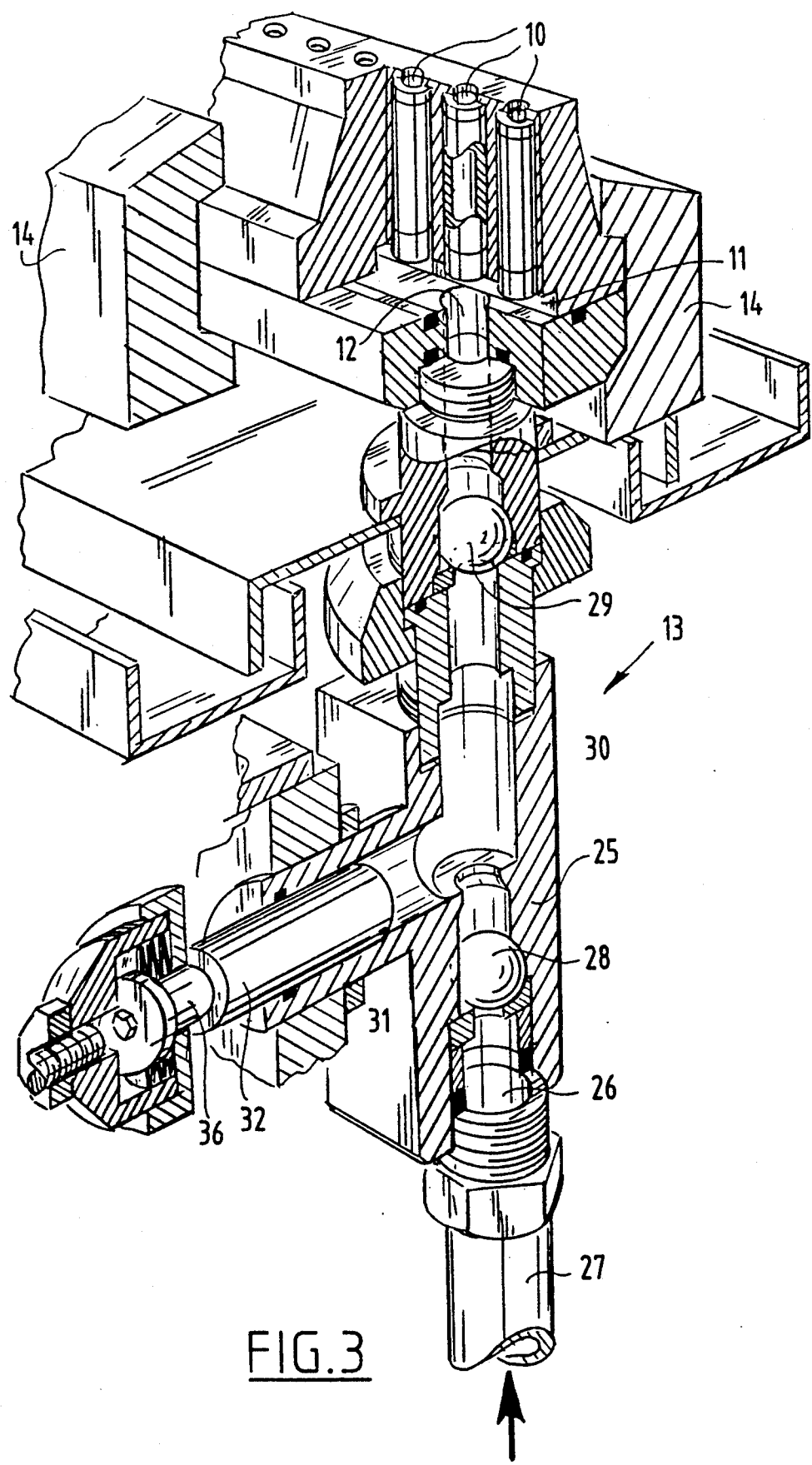
FIG. 3 shows a further detail of the device of FIG. 1 and 2 in perspective view with partly broken away parts.

With reference to FIG. 2 and 3, the spray beam 4 is embodied as a beam of trapezium-shaped cross section having a number of vertical bores in each of which is received a spray nozzle 10. The bores communicate on the underside with a common feed channel 11 which communicates with a feed conduit 12 which is connected in a manner to be designated below to a liquid feed system 13. The spray nozzle beam 4 is held in two frame beams 14 which form part of the main frame 1.

In the embodiment shown the feed conveyor 2 is an endless belt 15 provided with a reversing member 16 extending parallel and close to the side of the spray nozzle beam 4. The belt 15 is further trained around a tensioning or drive roller 17 with associated guide rollers 18. On the feed side the belt is embodied with a second reversing roller 19.

The discharge conveyor 3 is embodied in similar manner, with the understanding that it is arranged mirror symmetrically metrically relative to the spray nozzle beam 4. The driving of both conveyors takes place such that the upper part moves in the direction of the arrow P1.

The roller 5 embodied with a covering of elastic material can be of any type but is of a weight and is biased in the direction of the arrow P2 such that a meat piece V to be moved forward on the conveyor is subjected to a determined pressure such that the piece of meat undergoes a deforming at the position of the spray nozzle beam 4, whereby the thickness is reduced.

As already stated above, the roller 5 is freely rotatable on a rotational shaft 5' which is mounted in swivel arms 6 which are mutually connected with a coupling shaft 20 which is received in a fork-like bearing part 21 which supports on the frame 1. The coupling shaft 20 runs through beneath the upper part of conveyor 2. If use is made of a determined biasing of the roller 5 in the direction of the spray nozzle beam 4, hydraulic cylinders (not shown) can then act upon the arms 6.

There now follows a description of the liquid feed system, the liquid whereof serves as injection liquid for the meat piece V.

Arranged under the spray nozzle beam 4 is a valve housing 25 of which the intake opening 26 is connected to a feed conduit 27 for the injection liquid, for example brine with additives, subject to the meat piece for processing.

Arranged in the valve housing 25 is a non-return valve in addition to a non-return valve 29. Each non-return valve is embodied here as a ball that is movable in a chamber and which can close off and release a passage opening located thereunder.

Arranged between both ball valves 28 and 29 in the passage 30 of the valve housing 25 is a branch bore 31 in which a plunger 32 is reciprocally movable. In the embodiment of FIG. 2 the plunger is driven by a hydraulic cylinder 33 by connecting the piston rod 34 thereof via a coupling 35 to the plunger end part 36 of plunger 32.

Finally, it is noted that the outlet port of the upper valve part 29 is connected to the inlet bore 12 of the spray nozzle beam 4.

The above device operates as follows.

Figure 5:
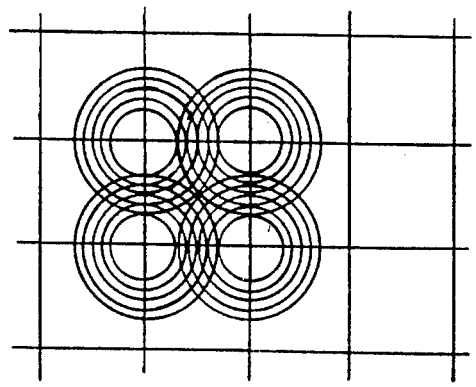
FIG. 5 shows a grid having shown therein the brine distribution in the piece of meat obtained with the method according to the invention.

When a randomly shaped piece of meat is laid on the upper part of the feed conveyor 2 it is carried in the direction of arrow P1 to the spray nozzle beam 4. At this location the piece of meat V is brought to the correct thickness by the pressure roller 5 and liquid in the spray nozzles 10 is in each case sprayed, preferably every centimeter as seen in the direction of arrow P1, into the meat on the underside. Spraying takes place for a very short time, between 12 and 60 milliseconds, in order to prevent stripes on the underside of meat piece V. With a correct distance interval between the spray nozzles 10, for instance 1 cm, a one centimeter grid can be obtained, see FIG. 5. By selecting the correct spraying pressure and spray velocity a good penetration depth of the liquid into the meat V can already be achieved, whereby the meat is contaminated not only regularly but also uniformly, see the concentric circles around the spraying positions in the grid according to FIG. 5. A uniform distribution of the brining liquid in the meat V is herewith assured.

Spraying of the liquid is effected by periodically moving the plunger 32 reciprocally in the branch chamber 31 of the valve housing 25. This is carried out in one case by actuating the cylinder 33 according to FIG. 2 and in the other by the motor 39 as in FIG. 3.

When the plunger 32 moves to the left liquid will be drawn via the lower valve 28 into the chamber 30, wherein after the plunger 32 has moved back the liquid in chamber 30 is placed under pressure, which results in the closing of the lower valve 28 and the opening of the upper valve 29, whereby the liquid can flow via opening 12 and channel 11 to the spray nozzle beam, whereafter it can exit to the outside via the spray nozzles 10.

Owing to the direct contact of the outflow opening of the spray nozzle 10 with the underside of the meat piece V the bottom surface of the meat piece V will not be damaged.

Shown below is a survey of test results on different sorts of meat.

| Chicken fillet: | required pressure | 90 bar |
|---|---|---|
| | sprayer orifice | 0.13 mm |
| | penetration to | 15 mm |
| | weight increase | 4–15% |
| | maximum increase | 25% |
| Chicken legs: | required pressure | 70–90 bar |
| | sprayer orifice | 0.13 mm |
| | penetration depth | 10–15 mm |
| | weight increase | 4–15% |
| | maximum increase | 20% |
| Pork: | required pressure | 200 bar |
| (shoulder) | sprayer orifice | 0.13 mm |
| | penetration depth | 25 mm |
| | weight increase | 4–30% |
| | maximum increase | 25% |
| Pork: | required pressure | 250 bar |
| (bacon backs) | sprayer orifice | 0.13 mm |
| | penetration depth | 30 mm |
| | weight increase | 4–20% |
| | maximum increase | 25% |
| Salmon: | required pressure | 60–80 bar |
| (smoked salmon) | sprayer orifice | 0.13 mm |
| | penetration depth | 20 mm |
| | weight increase | 3–7% |
| | maximum increase | 5% |

Figure 4:
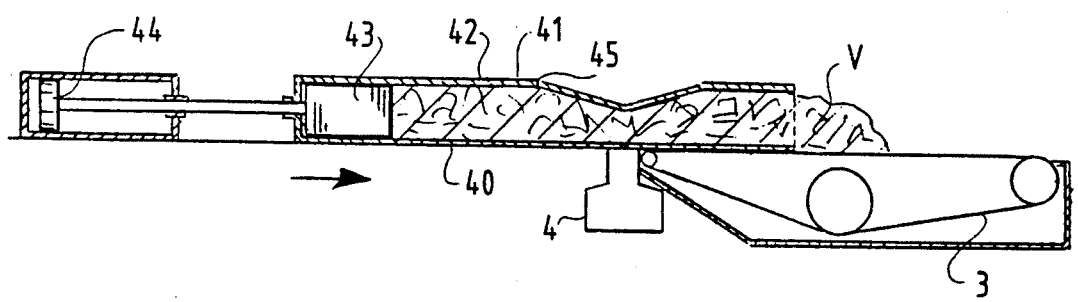
FIG. 4 is an upright section of a second embodiment of the device according to the invention provided with a pressure chamber.

There now follows a description of an alternative embodiment according to FIG. 4. In the schematic depiction of this embodiment the spray nozzle beam 4 and the discharge conveyor 3 are the only similarities to the embodiment of FIG. 1–3. The spray nozzle beam 4 forms part of the bottom wall 40 of a pressure chamber 41, the top wall 42 of which extends parallel to the bottom wall 40. The sides of the pressure chamber 41 are closed by fixed wall portions (not shown). In the pressure chamber 41 a rectangular piston 43 is reciprocally movable by a hydraulic cylinder 44. The wall 42 located opposite the bottom wall 40 converges from the point 45 in the direction of the spray nozzle beam 4, whereby a narrow passage opening is obtained at the position of the spray nozzles. Behind the spray nozzle beam 4 the pressure chamber widens again, wherein the open rear part debouches above the upper part of the discharge conveyor 3.

The device operates as follows: By actuating the hydraulic cylinder 44 the rectangular piston 43 will move to the right in FIG. 4, whereby the piece of meat pre-arranged in the pressure chamber 41 is transported in the direction of arrow P1 and pressed through the narrow opening at the spray nozzle beam 4, whereby a deforming of the meat piece takes place to the desired thickness. The operation of the spray nozzle beam 4 can take place in a manner corresponding to that described above whereby the meat piece can be processed in accordance with the same grid pattern as in FIG. 5. The piece of meat V is further carried away on the discharge conveyor 3.

The invention is not limited to the above described embodiments, wherein a kinematic reversal of the movement of the meat relative to the spray nozzles is conceivable. It is equally possible in a particular embodiment to move the spray nozzles relative to the stationary piece of meat V in order to obtain the desired spraying grid.

In addition the spray nozzles do not have to be disposed in a line but may have any suitable configuration. It is furthermore conceivable to arrange the spray nozzle movably in two coordinate axes whereby one spray nozzle would be sufficient.

The common feed chamber for all spray nozzles can of course be replaced by a separate feed for each nozzle, thus enabling volume control per nozzle.

I claim:

1. An apparatus for introducing liquid substances into a piece of meat, comprising a frame, at least one spray nozzle, means for holding said piece of meat in contact with said at least one spray nozzle, means for deforming said meat piece, means for generating a relative movement between said at least one spray nozzle and said piece of meat, said means for generating a relative movement is a conveyor, and a plurality of spray nozzles are disposed in a row, wherein said conveyor is an endless belt and at least one reversing roller extends parallel and adjacent to said plurality of spray nozzles.

2. The device according to claim 1, wherein said means for deforming said piece of meat further comprises a pressure roller having a rotational shaft which extends parallel to and at a distance from said plurality of spray nozzles.

3. The device according to claim 2, further wherein said rotational shaft is adjustable relative to said plurality of spray nozzles.

4. The device according to claim 3, further wherein each spray nozzle is connected to the outlet of a plunger pump.

5. An apparatus for introducing liquid substances into a piece of meat, comprising a frame, at least one spray nozzle, and means for holding said piece of meat in contact with said at least one spray nozzle, means for deforming said meat piece, said means for deforming is a pressure chamber provided with two walls, in one of which said at least one spray nozzle is arranged and the other of which converges in the direction of said spray nozzle, wherein in said pressure chamber a driven piston moveable reciprocally therein is arranged as a transporting means.

6. The device according to claim 5, wherein behind said spray nozzle is a discharge conveyor, said discharge conveyor further comprising an endless belt.

* * * * *

UNITED STATES PATENT AND TRADEMARK OFFICE
CERTIFICATE OF CORRECTION

PATENT NO. : 5,176,071

DATED : January 5, 1993

INVENTOR(S) : Lambertus G. M. Klaassen

It is certified that error appears in the above-identified patent and that said Letters Patent is hereby corrected as shown below:

Column 3 Line 5 "symmetrically metrically" should read --symmetrically--.

Column 3 Lines 34-35 after "non-return valve" insert --28--.

Claim 5 Line 20 Column 6 after "piece," insert --wherein--.

Signed and Sealed this

Eleventh Day of January, 1994

Attest:

BRUCE LEHMAN

Attesting Officer    Commissioner of Patents and Trademarks